United States Patent [19]

Fukumura

[11] Patent Number: 5,216,434
[45] Date of Patent: Jun. 1, 1993

[54] DIVERSITY RECEIVING APPARATUS
[75] Inventor: Yukio Fukumura, Tokyo, Japan
[73] Assignee: NEC Corporation, Tokyo, Japan
[21] Appl. No.: 869,104
[22] Filed: Apr. 14, 1992

Related U.S. Application Data

[63] Continuation of Ser. No. 524,896, May 18, 1990, abandoned.

[30] Foreign Application Priority Data

May 18, 1989 [JP] Japan ................................. 1-125632

[51] Int. Cl.$^5$ ..................... H01Q 3/240; H01Q 23/00; H01Q 1/00; G01R 31/08
[52] U.S. Cl. .................................. 343/876; 343/853; 343/894; 324/538; 324/542; 455/277.1
[58] Field of Search ............... 343/703, 722, 749, 853, 343/876, 894; 455/273, 277, 272; 340/652; 324/538, 539, 542, 556

[56] References Cited

U.S. PATENT DOCUMENTS

| | | | |
|---|---|---|---|
| 2,196,590 | 4/1940 | Koch | 343/894 |
| 3,932,858 | 1/1976 | Smith et al. | 340/652 |
| 3,940,700 | 2/1976 | Fischer | 343/894 |
| 4,268,834 | 5/1981 | Henry | 343/722 |
| 4,403,343 | 9/1983 | Hamada | 455/277 |
| 4,525,869 | 6/1985 | Hamada et al. | 455/277 |
| 4,743,887 | 5/1988 | Pothier | 343/894 |

Primary Examiner—Rolf Hille
Assistant Examiner—Peter Toby Brown
Attorney, Agent, or Firm—Sughrue, Mion, Zinn, Macpeak & Seas

[57] ABSTRACT

A diversity receiving apparatus having a plurality of antennas, antenna feeders each being associated with respective one of the antennas, and a single diversity receiving section to which the antennas are connected via the associated antenna feeders. A breakage detecting circuit is included in the apparatus for detecting the breakage of any one of the antenna feeders. The detecting circuit uses an antenna whose radiation element is connected to ground and, by applying a predetermined DC potential to the hot line of the antenna feeder via a resistor, constantly monitors the potential. On the breakage of the antenna feeder, the detecting circuit produces an alarm in response to the resultant change in the potential. The apparatus is capable of readily detecting that the diversity reception effect has been lost and the receiving ability has been degraded due to the breakage of the antenna feeder.

24 Claims, 2 Drawing Sheets

DIVERSITY RECEIVING APPARATUS

This is a continuation of application Ser. No. 07/524,896 filed May 18, 1990, now abandoned.

BACKGROUND OF THE INVENTION

The present invention relates to a diversity receiving apparatus for receiving a signal by space diversity and, more particularly, to a vehicle-mounted space diversity receiving apparatus.

A diversity receiving apparatus for receiving signals transmitted by radio waves by space diversity is known in the art. This kind of receiving apparatus has a plurality of antennas for picking up radio signals. The signals picked up by the individual antennas are switched over or combined and then fed to a diversity receiver. A prerequisite with such an apparatus is that the antennas be spaced apart from each other. When the diversity receiving apparatus is mounted on a vehicle, the individual antennas are affixed to the roof, windshields and so forth of the vehicle. Each antenna is connected to the diversity receiver by an exclusive antenna feeder which propagates a signal therethrough.

When one of antenna circuits or channels included in the diversity receiving apparatus and constituted by an antenna, antenna feeder and so forth fails, the apparatus is capable of receiving a signal by the other antenna circuits. In this condition, despite that the receiving ability of the apparatus has been degraded, the reception seemingly remains normal. The user, therefore, often overlooks such a failure of the antenna circuit. This problem is especially serious when it comes to a vehicle-mounted diversity receiving apparatus, because antenna feeders of the apparatus are apt to break due to vibrations and impacts particular to on-road vehicles.

SUMMARY OF THE INVENTION

It is therefore an object of the present invention to provide a diversity receiving apparatus capable of readily detecting the deterioration of a receiving ability ascribable to the breakage of an antenna feeder.

A diversity receiving apparatus of the present invention has a plurality of antennas for receiving signals transmitted by radio waves; diversity receiving section means for receiving one of the signals coming in through the antennas; antenna feeder means for connecting the antennas to the diversity receiving section, respectively; and means for detecting breakage of any of the antenna feeders.

Preferably, the detecting means has a power source connected through a resistor to one end of the antenna feeder connecting the diversity receiving section and an antenna whose radiation element is connected to ground, and a detecting circuit connected to the one end of the antenna feeder for detecting a variation in the potential appearing on the one end. On the breakage of the antenna feeder, the detecting circuit turns on a light emitting diode in response to the resultant increase in the potential. This facilitates the detection of the breakage of an antenna feeder which degrades the receiving ability of the diversity receiving apparatus.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENTS

Figure 1:
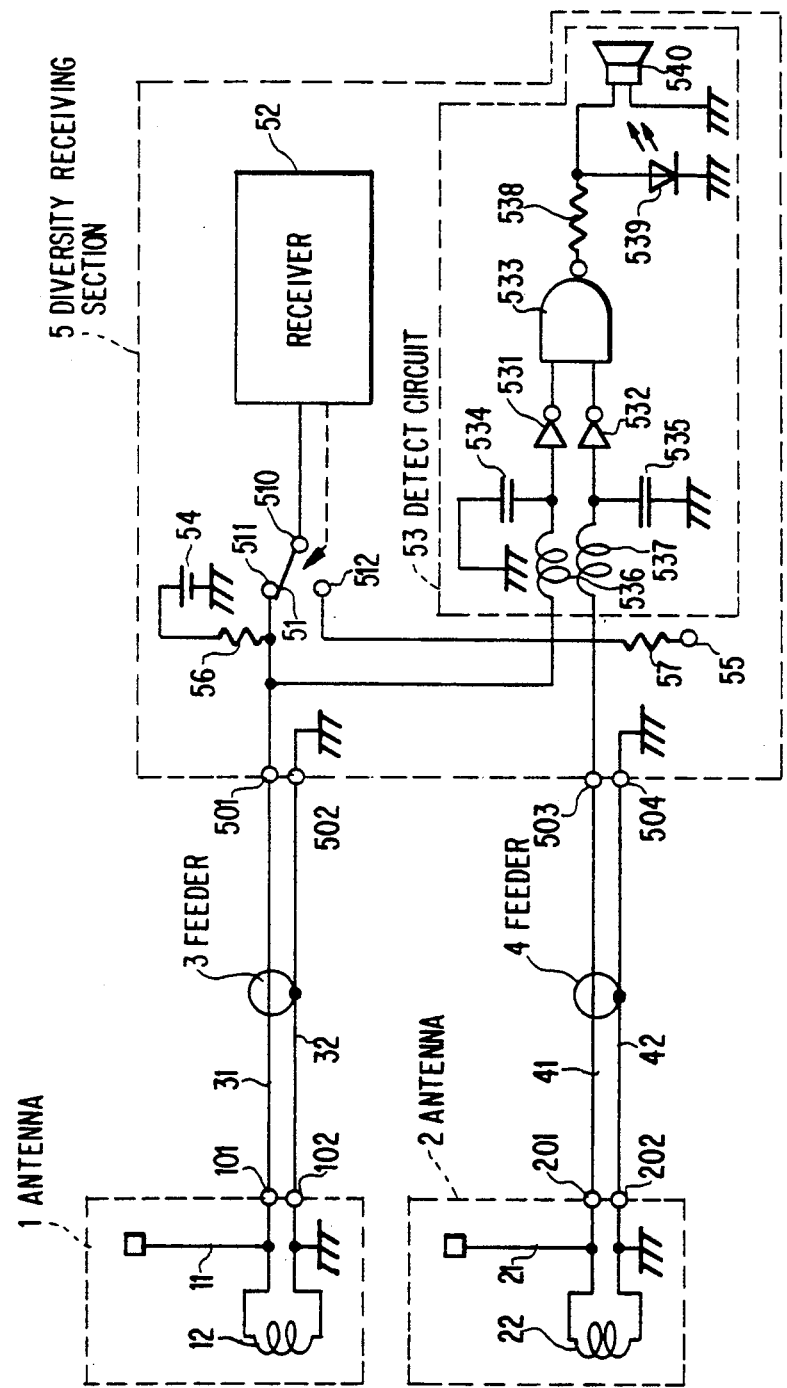
FIG. 1 is a block diagram schematically showing a diversity receiving apparatus embodying the present invention.

In FIG. 1, a diversity receiving apparatus includes rod antennas 1 and 2. The rod antennas 1 and 2 are connected to a diversity receiving section 5 through antenna feeders 3 and 4, respectively. The rod antenna 1 comprises a radiation element 11 whose one end is grounded through a choke coil or inductance 12 and connected to one end 101 of the hot line 31 of antenna feeder 3. The outer conductor 32 of antenna feeder 3 is connected to ground through its ends 102 and 502. Likewise, the rod antenna 2 comprises a radiation element 21 whose one end is grounded through a choke coil or inductance 22 and connected to one end 201 of the hot line 41 of antenna feeder 4. The outer conductor 42 of antenna feeder 4 is connected to ground through its ends 202 and 504.

The diversity receiving section 5 comprises an antenna switch 51 whose one input terminal 511 is connected to the other end 501 of hot line 31. The other input terminal 512 of antenna switch 51 is connected to the other end 503 of hot line 41. The output terminal 510 of switch 51 is connected to the input of a receiver 52.

The diversity receiving section 5 also comprises a breakage detecting circuit 53 which includes a pair of low-pass filters each having a choke coil or inductance 536 or 537 and a capacitor 534 or 535. One end of coil 536 is connected to the other end 501 of feeder hot line 31 while one end of coil 537 is connected to the other end 503 of feeder hot line 41. The other end of coil 536 is connected to ground through capacitor 534 while the other end of coil 537 is connected to ground through the capacitor 535. The junction of coil 536 and capacitor 534 is connected to one of two inputs of NAND gate 533 through an inverter 531. The junction of coil 537 and capacitor 535 is connected to the other of two NAND gate 533 inputs through an inverter 532. The output of NAND gate 533 is connected to the anode of a light emitting diode (LED) 539 through a resistor 538. The cathode of LED 539 is grounded.

The diversity receiving section 5 further comprises a direct current (DC) voltage source 54 which applies a positive potential V to the other ends 501 and 503 through resistors 56 and 57, respectively. One end of resistor 57 is connected to the positive terminal of voltage source 54 through a terminal 55.

In operation, the radiating element 11 picks up a radio frequency signal and provides the picked-up-signal to the antenna switch 51 through the antenna feeder 3. The choke coil 12 blocks the picked-up radio frequency signal while passing a signal having a lower frequency than the frequency of the radio frequency signal. The radiating element 21 picks up a radio frequency signal and provides the picked-up signal to the antenna switch 51 through the antenna feeder 4. The choke coil 22 has the same function as the choke coil 12. The antenna switch provides the receiver 52 with one of radio signals from the antennas 1 and 2 under control of the receiver 52. The receiver controls the switchover of antenna switch 51 based on, for example, the field strength levels obtained from the radio frequency signals. The above-mentioned antenna diversity operation is well known in the art and thus no further description thereabout will be provided in this specification. It should be noted that the present apparatus may use other types of diversity reception, for example, a signal combining diversity reception.

Even if one of antenna feeders 3 and 4 fails, the receiver 52 can still receive a radio signal due to the diversity function. More specifically, if the antenna feeder 3 is broken, the antenna switch 51 provides a radio frequency signal from the antenna 2 to the receiver 52. Thus, the user overlooks the breakage of the antenna feeder 3. The present invention prevents this overlooking by adding the breakage detecting circuit 53.

So long as the hot line 31 of antenna feeder 3 is held in normal connection, the DC potential at the terminal 501 remains in a ground level of "L", because the terminal 501 is grounded through the hot line and the coil 12. When the hot line 31 is broken, the DC potential at the terminal 501 turns to the voltage V or "H". Likewise, the hot line 41 of antenna feeder 4 is held in normal connection, the DC potential at the terminal 503 remains in "L", while when the hot line 41 is broken, the DC potential at the terminal 503 turns to "H". It follows that the output of NAND gate 533 is in "L" only when both the hot lines 31 and 41 are connected normally, maintaining the LED 539 turned off. On the other hand, when at least one of the hot lines 31 and 41 is broken, the output level of the NAND gate 533 turns from "L" to "H" with the result that the LED 539 glows. The low-pass filter including the coil 536 and 537 and the capacitor 534 or 535 blocks signals having frequencies close to the frequency of signals coming in through the associated rod antenna 1 or 2, while passing signals having lower frequencies than the same.

In the above construction, assume that either one of the antenna feeders 3 and 4 inclusive of the hot lines 31 and 41 has been broken, but a radio frequency signal is being received by either one of the antennas 1 and 2. Even in such a condition which seemingly is normal, the user of the apparatus is alerted to the breakage of the antenna feeder 3 or 4 by the LED 539 which will be glowing then. The LED 539 may be replaced by a beeper 540 which generates an alert tone in response to the "H" output of NAND gate 533.

Figure 2:
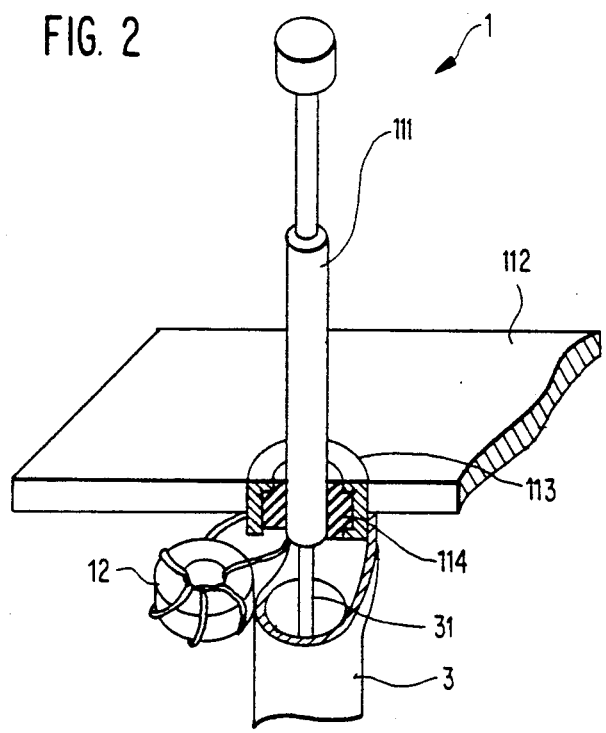
FIG. 2 is a partly taken away perspective view of an antenna included in the FIG. 1 apparatus.

Referring to FIG. 2, the rod antenna 1 has a radiation element 111, a ground plate 112 made of metal, a retainer 113 also made of metal, a dielectric 114 which is inherently low in loss for a received radio signal, and the choke coil 12. The retainer 113 is welded or otherwise affixed to the ground plate 112, while the radiation element 111 is affixed to the retainer 113 with the intermediary of the dielectric 114. The choke coil 12 is connected at one terminal to the base portion of the radiation element 111 and at the other terminal to the retainer 113 by welding or similar technology. The hot line 31 of the antenna feeder 3, or the center conductor of the coaxial cable in the illustrative embodiment, is received in and connected to the base portion of the radiator 111. The choke coil 12 is welded or otherwise rigidly connected to the ground plate 112. The other rod antenna 2 has the same structure as the rod antenna 1.

The illustrative embodiment has two rod antennas 1 and 2 each being connected to the diversity receiving section by an exclusive antenna feeder. Of course, such an arrangement is similarly applicable to a diversity receiving apparatus having three or more antennas. Assume that some antennas are connected to a diversity receiving section via individual antenna feeders and the others are directly connected to the diversity receiving section, as practiced from time to time. Then, the circuitry responsive to the breakage of an antenna feeder will of course be associated only with those antenna circuits which have the antenna feeders.

The rod antennas shown in FIGS. 1 and 2 have radiation elements which are not connected to ground and, therefore, each may be implemented as a whip antenna, as desired. When use is made of an antenna whose radiation element is directly connected to ground, i.e., a unipole antenna having a grounded matching stub, the choke coil 12 for indirectly connecting the radiation element to ground is not necessary. While the choke coils 12 and 22 each serving as a lumped constant circuit are used as circuits which block signals and exhibit a low resistance for DC, they may be replaced with distributed constant circuits having a similar impedance characteristic.

Figure 3:
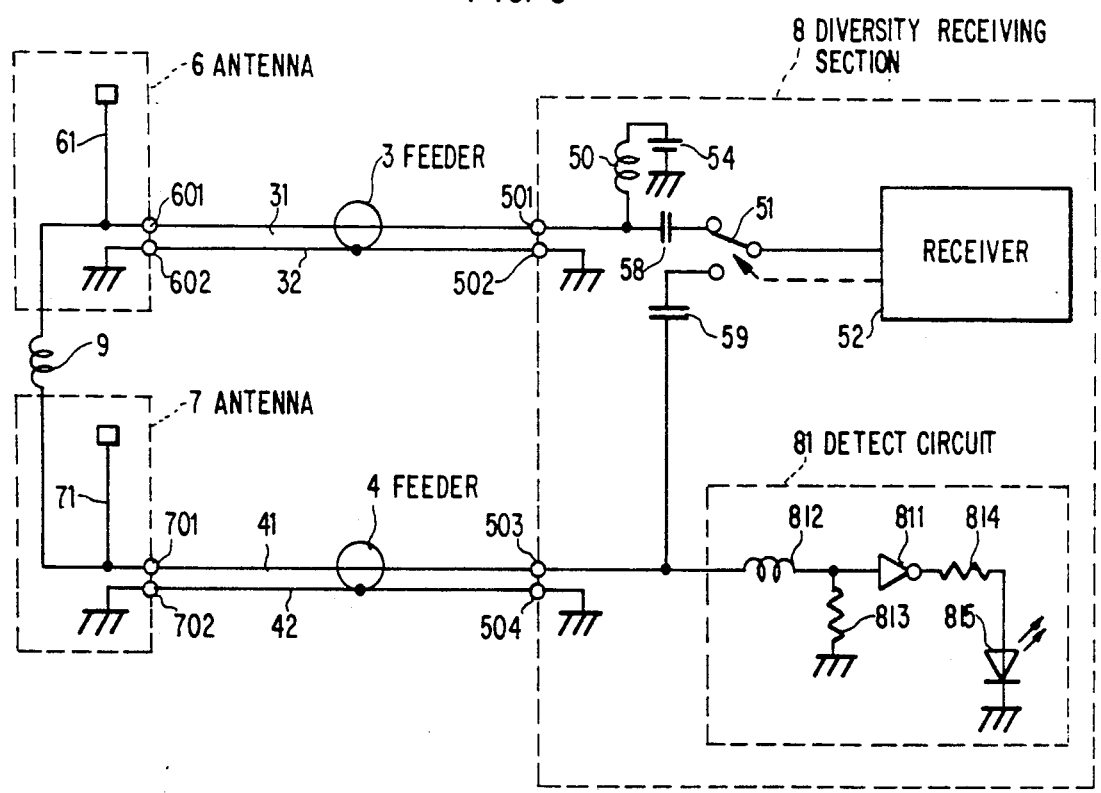
FIG. 3 is a schematic block diagram showing an alternative embodiment of the diversity receiving apparatus in accordance with the present invention.

Referring to FIG. 3, an alternative embodiment of the diversity receiving apparatus in accordance with the present invention is shown. In the figures, the same or similar components are designated by like reference numerals, and redundant description will be avoided for simplicity. In FIG. 3, the diversity receiving apparatus has two antennas 6 and 7, antenna feeders 3 and 4 connected at one ends to the antennas 6 and 7, respectively, a diversity receiving section 8 connected to the other ends of the antenna feeders 3 and 4, and a choke coil 9.

The antennas 6 and 7 have radiation elements 61 and 71, respectively. The choke coil 9 chokes received signals associated with the radiation elements 61 and 71 and connects the elements 61 and 71 with respect to DC. The radiation elements 61 and 71 are not connected to ground.

The diversity receiving section 8 has an antenna switch 51, a receiver 52 for diversity reception, a detecting circuit 81, capacitors 58 and 59, and a DC voltage source 54. The antenna switch 51 is connected at one input terminal to the other end 501 of the antenna feeder 3 through the capacitor 58 and connected at the other input terminal to the other end 503 of the antenna feeder 4 through the capacitor 59. The receiver 52 controls the switchover of the switch 51, as in the FIG. 1 apparatus. The capacitors 58 and 59 pass signals coming in through the associated antennas 6 and 7 while blocking DC.

The other end 501 of the hot line 31 of the antenna feeder 3 is connected to the DC voltage source 54 through a choke coil 50. The detecting circuit 81 is connected to the other end 503 of the hot line 41 of the antenna feeder 4 so as to monitor the DC potential appearing there.

The detecting circuit 81 includes an inverter 811, a choke coil 812 connected between the input terminal of inverter 811 and the other end 503 of the hot line 41, a resistor 813 connected between the input terminal of inverter 811 and ground, a resistor 814 connected at one end to the output of inverter 811, and an LED 815 whose anode and cathode are connected to the other end of resistor 814 and ground, respectively. The choke coil 812 blocks a signal coming in through the antenna 7 while exhibiting a low resistance for DC.

The input terminal of inverter 811 is connected to the voltage source 54 through the choke coil 812, antenna feeder 4, antenna 7, choke coil 9, antenna 6, antenna feeder, and choke coil 50. The output terminal of inverter 811 is connected to ground through the LED 815. In this configuration, when the hot lines 31 and 41 of the antenna feeders 3 and 4 are not broken, the level on the input terminal of inverter 811 is "H" while the level on the output terminal of the same is "L". When at least one of the hot lines 31 and 41 is broken, the input and output terminals of inverter 811 turn to "L" and "H", respectively. As a result, the LED 815 is turned on to alert the user of the apparatus to the breakage of the antenna feeder 3 inclusive of the hot line 31 or the antenna feeder 4 inclusive of the hot line 41.

In summary, it will be seen that the present invention has a breakage detection circuit detecting the breakage of an antenna feeder and thereby prevents the user from overlooking the fact that the diversity reception effect has been lost and, therefore, the receiving ability has been lowered due to the breakage of an antenna feeder.

What is claimed is:

1. A diversity receiving apparatus comprising:
   a plurality of antennas for receiving radio frequency signals;
   a diversity receiving section for receiving the radio frequency signals coming in through said plurality of antennas;
   at least one antenna feeder connecting an associated one of said plurality of antennas to said diversity receiving section;
   means for applying a DC voltage of said antenna feeder, a magnitude of said DC voltage being independent of the radio frequency signals; and
   means for detecting a change in said DC voltage, so that breakage of said antenna feeder may be detected irrespective of levels of the radio frequency signals.

2. An apparatus as claimed in claim 1, wherein one of said plurality of antennas comprises:
   a radiation element; and
   a signal blocking circuit connected at one end thereof to said radiation element and at the other end thereof to ground for choking the radio frequency signal and exhibiting a low resistance with respect to DC.

3. An apparatus as claimed in claim 2, wherein said signal blocking circuit comprises a choke coil.

4. An apparatus as claimed in claim 2, wherein said one antenna has a radiation element whose one end is connected to one end of said antenna feeder and a structure in which said radiation element is connected to ground via said signal blocking circuit.

5. An apparatus as claimed in claim 4, wherein said detecting means comprises a light emitting diode for reporting breakage of said antenna feeder.

6. A diversity receiving apparatus comprising:
   two antennas each having a radiation element;
   a choke coil connecting said two antennas to each other;
   a diversity receiving section;
   a first and second antenna feeders each being connected at one end to respective ones of said two antennas;
   means for selectively connecting the other end of said first and second antenna feeders to said diversity receiving section with respect to DC;
   a power source connected to said other end of said first antenna feeder for applying a predetermined DC potential to said other end of said first antenna feeder; and
   a detecting circuit connected to said other end of said second antenna feeder for detecting a variation in a DC potential appearing on said other end of said second antenna feeder.

7. An apparatus as claimed in claim 6, wherein said detecting circuit comprises a light emitting diode for reporting breakage of said antenna feeder.

8. A diversity reception apparatus comprising:
   first and second antenna means for picking up radio frequency signals;
   diversity receiving means coupled to said first and second antenna means and responsive to said radio frequency signals picked up by said first and second antenna means for performing a diversity reception operation;
   first antenna feeder means connected between said first antenna means and said diversity receiving means for feeding a radio frequency signal from said first antenna means to said diversity receiving means;
   voltage supply means for applying a DC voltage on said first antenna feeder means, a magnitude of said DC voltage being independent of the radio frequency signals; and
   detecting means for detecting a change in said DC voltage so that breakage of said first antenna feeder means may be detected irrespective of levels of the radio frequency signals.

9. An apparatus as claimed in claim 8, further comprising second antenna feeder means connected between said second antenna means and said diversity receiving means for feeding a radio frequency signal from said second antenna means to said diversity receiving means, wherein said voltage supply means applies a DC voltage on both said first and second antenna feeder means, and wherein said detecting means detects a change in said DC voltage applied on either said first or second antenna feeder means.

10. An apparatus as claimed in claim 9, wherein said detecting means comprises first means for detecting said change to produce a detect signal; and alert means responsive to said detect signal for producing an alert signal.

11. An apparatus as claimed in claim 10, wherein said alert means comprises an LED for glowing in response to said detect signal.

12. An apparatus as claimed in claim 10, wherein said alert means comprises a beeper for generating an alert tone in response to said detect signal.

13. An apparatus as claimed in claim 8, wherein said diversity receiver means comprises: an antenna switch for selecting one of said radio frequency signals in response to a switch control signal; and a diversity receiver for receiving the selected radio frequency signal and producing said switch control signal based on said radio frequency signals.

14. An apparatus comprising:
   first and second antenna element means whose one ends are respectively coupled to ground, for picking up radio frequency signals;
   diversity receiver means responsive to radio frequency signals picked up by said first and second antenna element means for performing a diversity reception operation;

first and second feeder means for connecting said first and second antenna element means to said diversity receiver means, respectively;

voltage source means for applying a DC voltage on said first and second feeder means, a magnitude of said DC voltage being independent of the radio frequency signals; and detecting means for detecting a change in said DC voltage applied on either said first or second feeder means, so that breakage of said first or second feeder means may be detected irrespective of levels of the radio frequency signals.

15. An apparatus as claimed in claim 14, wherein said detecting means comprises:

first and second low-pass filter means whose inputs are coupled to one ends of said first and second feeder means, respectively;

first and second inverter means whose inputs are coupled to the outputs of said first and second low-pass filter means, respectively; NAND gate means whose two inputs are coupled to the outputs of said first and second inverter means, respectively; and LED means coupled between the output of said NAND gate means and ground.

16. An apparatus as claimed in claim 14, wherein said detecting means comprises:

first and second low-pass filter means whose inputs are coupled to one ends of said first and second feeder means, respectively;

first and second inverter means whose inputs are coupled to the outputs of said first and second low-pass filter means, respectively; NAND gate means whose two inputs are coupled to the outputs of said first and second inverter means, respectively; and tone generator means for generating an alert tone in response to a status change in the output of said NAND gate means.

17. An apparatus comprising:

first and second antenna element means whose one ends are coupled to each other, for picking up radio frequency signals;

diversity receiving means responsive to radio frequency signals picked up by said first and second antenna element means for performing a diversity reception operation;

first and second feeder means for coupling said first and second antenna element means to said diversity receiver means, respectively;

voltage source means for applying a DC voltage on one end of said first feeder means which is to be coupled to said diversity receiver means, a magnitude of said DC voltage being independent of the radio frequency signals; and detecting means connected to one end of said second feeder means which is to be coupled to said diversity receiver means, for detecting a change in said DC voltage applied from said voltage source means.

18. An apparatus as claimed in claim 17, wherein said detecting means comprises:

low-pass filter means whose input is coupled to said one end of said second feeder means;

inverter means whose input is coupled to the output of said low-pass filter means; and LED means connected between the output of said inverter means and ground.

19. An apparatus as claimed in claim 17, wherein said detecting means comprises:

low-pass filter means whose input is coupled to said one end of said second feeder means; and alert means for generating an alert tone in response to the output of said low-pass filter means.

20. A method of detecting breakage of either one of first and second antenna feeders which feed radio frequency signals from first and second antennas, respectively, to a diversity receiver, said method comprising the following steps of:

feeding a first radio frequency signal from said first antenna to said diversity receiver through said first antenna feeder;

feeding a second radio frequency signal from a second antenna to said diversity receiver through said second antenna feeder;

applying a DC voltage on said first antenna feeder, a magnitude of said DC voltage being independent of the radio frequency signals; and detecting a voltage change in said DC voltage to produce a detect signal.

21. A method as claimed in claim 20, further comprising the step of, responsive to said detect signal, annunciating the failure of either said first or second antenna feeder.

22. A method as claimed in claim 21, wherein said annunciating step comprises the step of, responsive to said detect signal, causing an LED to glow.

23. A method as claimed in claim 21, wherein said annunciating step comprises the step of, responsive to said detect signal, causing a tone generator to generate an alert tone.

24. A method as claimed in claim 20, further comprising the step of selectively receiving one of said first and second radio frequency signals at said diversity receiver.

* * * * *